(12) United States Patent
Cheng et al.

(10) Patent No.: US 12,119,213 B2
(45) Date of Patent: Oct. 15, 2024

(54) POWER SUPPLY DEVICE FOR TRIPLE QUADRUPOLE MASS SPECTROMETER

(71) Applicants: NANJING QLIFE MEDICAL TECHNOLOGY CO., LTD., Jiangsu (CN); ZHEJIANG QJADE PRECISION TECHNOLOGY CO., LTD., Zhejiang (CN)

(72) Inventors: Xiaoliang Cheng, Jiangsu (CN); Han Lu, Jiangsu (CN); Qiang Xu, Jiangsu (CN); Wei Zhang, Jiangsu (CN)

(73) Assignees: NANJING QLIFE MEDICAL TECHNOLOGY CO., LTD., Jiangsu (CN); ZHEJIANG QJADE PRECISION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/279,972

(22) PCT Filed: Dec. 30, 2022

(86) PCT No.: PCT/CN2022/144249
§ 371 (c)(1),
(2) Date: Sep. 1, 2023

(87) PCT Pub. No.: WO2024/031927
PCT Pub. Date: Feb. 15, 2024

(65) Prior Publication Data
US 2024/0266159 A1 Aug. 8, 2024

(30) Foreign Application Priority Data
Aug. 9, 2022 (CN) .......................... 202210952233.6

(51) Int. Cl.
*H01J 49/02* (2006.01)
*H01J 49/42* (2006.01)

(52) U.S. Cl.
CPC ......... *H01J 49/022* (2013.01); *H01J 49/4225* (2013.01)

(58) Field of Classification Search
CPC .......... H01J 49/02; H01J 49/022; H01J 49/42; H01J 49/4225
See application file for complete search history.

(56) References Cited

U.S. PATENT DOCUMENTS

| 11,336,290 B2 * | 5/2022 | Smith ................... G01J 3/4338 |
| 2012/0145892 A1 * | 6/2012 | Gershman ............. H01J 49/022 250/282 |

(Continued)

FOREIGN PATENT DOCUMENTS

| CN | 102457193 A | 5/2012 |
| CN | 202872628 U | 4/2013 |

(Continued)

*Primary Examiner* — David E Smith
(74) *Attorney, Agent, or Firm* — Bret E. Field; Bozicevic, Field & Francis LLP

(57) ABSTRACT

Disclosed is a power supply device for a triple quadrupole mass spectrometer, including a power input module, a sequence generator, and an output control module. The power supply input module is connected to a power supply. A positive output terminal of the power supply input module is connected to the sequence generator, so that the sequence generator converts a positive output voltage of the power supply into an auxiliary voltage and a relay control signal. The sequence generator is connected to the power input module to transmit the auxiliary voltage and the relay control signal to the output control module, thereby controlling on and off of the output control module, and sequentially powering on the output control module. The power supply input module is connected to the output control module to transmit an input voltage from the power supply to the output control module.

7 Claims, 3 Drawing Sheets

(56) References Cited

U.S. PATENT DOCUMENTS

2020/0136555 A1* 4/2020 Schoessow ............... H03F 3/21
2021/0103430 A1 4/2021 Wang et al.

FOREIGN PATENT DOCUMENTS

| CN | 107026578 A | 8/2017 |
| CN | 109358740 A | 2/2019 |
| CN | 115208189 A | 10/2022 |

* cited by examiner

POWER SUPPLY DEVICE FOR TRIPLE QUADRUPOLE MASS SPECTROMETER

The present application claims priority to Chinese patent application No. 202210952233.6, filed with the China National Intellectual Property Administration on Aug. 9, 2022, and entitled "POWER SUPPLY DEVICE FOR TRIPLE QUADRUPOLE MASS SPECTROMETER", which is incorporated herein by references in its entirety.

FIELD OF THE INVENTION

The present application relates to the technical field of circuits, and in particular, to a power supply device for a triple quadrupole mass spectrometer.

BACKGROUND OF THE INVENTION

A triple quadrupole mass spectrometer is a detecting instrument used in the fields of biology, aquaculture, environmental science and technology, and medical treatment. By means of substance gasification and electron impact, a mass-to-charge ratio of a to-be-detected sample is detected, to determine composition of the to-be-detected sample, having characteristics of high sensitivity, fast analysis speed, and low sample usage.

In clinical practice, during use, the triple quadrupole mass spectrometer requires a dedicated power supply device to supply power thereto. However, because the power supply device of the triple quadrupole mass spectrometer faces requirements for a plurality of groups of multipath power supply, a design of the power supply device is crucial. Each group of power supply circuits faces a problem of noise crosstalk, which seriously affects quality of a power supply.

To avoid inter-circuit crosstalk of the power supply device, a plurality of groups of independent devices are typically used to supply power to the triple quadrupole mass spectrometer. However, use of a plurality of groups of independent power supplies greatly increases power supply costs. Moreover, when being powered on by a plurality of groups of power supply circuits simultaneously, demand for a current at a moment of power on is too large to meet subsequent electrical requirements.

SUMMARY OF THE INVENTION

The present application provides a power supply device for a triple quadrupole mass spectrometer, to resolve a problem that a power supply device for a triple quadrupole mass spectrometer cannot satisfy requirements on power supply.

A power supply device for a triple quadrupole mass spectrometer provided in the present application, including a power input module, a sequence generator, and an output control module, where the power input module, having a voltage input terminal and a voltage output terminal, includes an energy storage circuit, where the voltage input terminal is connected to a power supply, and is configured for receiving of an input voltage from the power supply; the energy storage circuit is connected to the power supply through the voltage input terminal; and the energy storage circuit is connected to the sequence generator and the output control module through the voltage output terminal, so as to output the input voltage from the power supply through the voltage output terminal;

the sequence generator, having a single voltage input terminal, an auxiliary voltage output terminal and a relay signal output terminal, includes a transformer circuit and a relay signal circuit, where the single voltage input terminal is connected to a positive polarity of the voltage output terminal; the transformer circuit is connected to the single voltage input terminal and is configured to convert a positive voltage from the voltage output terminal into an auxiliary voltage lower than the positive voltage from the voltage output terminal, and the transformer circuit is connected to the auxiliary voltage output terminal to output the auxiliary voltage through the auxiliary voltage output terminal; and the relay signal circuit is connected to the auxiliary voltage output terminal and is configured to convert the auxiliary voltage into a relay signal, and the relay signal circuit is connected to the relay signal output terminal to output the relay signal through the relay signal output terminal; and the output control module, having a primary voltage input terminal, an auxiliary voltage input terminal, a relay signal input terminal and a total voltage output terminal, includes a relay control circuit, where the primary voltage input terminal is connected to the voltage output terminal; the auxiliary voltage input terminal is connected to the auxiliary voltage output terminal; the relay signal input terminal is connected to the relay signal output terminal; and the relay control circuit is connected to the relay signal input terminal to control on and off of the relay control circuit according to the relay signal, is connected to the auxiliary voltage input terminal to enable the auxiliary voltage to supply power to the relay control circuit, and is connected to the primary voltage input terminal and the total voltage output terminal to output the input voltage from the power supply.

The power input module is connected to the output control module, so that the input voltage from the power supply is processed and then is transmitted to the output control module. The output control module transmits the processed power supply voltage to an electrical device under control of the sequence generator, thereby ensuring quality of power supply of the power supply device.

Optionally, the energy storage circuit includes a first common-mode inductor and a first capacitor; the first common-mode inductor is connected in parallel to the first capacitor, where the first common-mode inductor is connected in parallel to the first capacitor, and the first common-mode inductor and the first capacitor are disposed between the voltage input terminal and the voltage output terminal. Passive filtering and energy storage functions are implemented in the energy storage circuit through the first common-mode inductor and the first capacitor.

Optionally, the power input module further includes a current-limiting circuit, where the current-limiting circuit includes a first fuse and a first diode, and where the first diode is connected in parallel to the first fuse, the first fuse is connected in series to the voltage input terminal, and the first diode is connected in parallel to the first common-mode inductor. Current-limiting protection is performed on the energy storage circuit through the first fuse and the first diode.

Optionally, the transformer circuit includes an integrated circuit chip and a second capacitor, where the integrated circuit chip is connected in parallel to the second capacitor, and a pin of the integrated circuit chip is connected to the single voltage input terminal, to convert the input voltage from the power supply to half of the original voltage.

Optionally, where the relay signal circuit includes a second diode, a third capacitor, a charging resistor, and at least two first metal-oxide semiconductor field-effect transistors, where the at least two first metal-oxide semiconductor field-effect transistors are connected in parallel to each other, the second diode is connected in parallel to the charging resistor, the third capacitor is connected in series to the charging resistor, and the first metal-oxide semiconductor field-effect transistor is connected in parallel to the charging resistor. After powering on, by cooperation of the second diode with the charging resistor, the third capacitor is charged through the charging resistor. After the third resistor is charged to reach an on threshold of the first metal-oxide semiconductor field-effect transistor, the relay control circuit of the corresponding output control module is turned on.

Optionally, the relay control circuit includes a relay, a third diode, and a second metal-oxide semiconductor field-effect transistor, where the relay is connected in series to the second metal-oxide semiconductor field-effect transistor, the third diode is connected in parallel to the relay, the relay is connected in series to the primary voltage input terminal and the auxiliary voltage input terminal, the second metal-oxide semiconductor field-effect transistor is connected in series to the relay signal input terminal, and the relay is connected in series to the total voltage output terminal, to control on and off of the output control module through the relay.

Optionally, the relay control circuit further includes a second fuse and a fourth diode, where the second fuse is connected in parallel to the fourth diode, and the second fuse is connected in series between the relay and the total voltage output terminal, to protect an output current.

Optionally, the relay control circuit further includes a filter circuit including a second common-mode inductor, a fourth capacitor, a fifth capacitor, a filter resistor, and a triode, where the filter resistor is connected in parallel to the fourth capacitor, the second common-mode inductor is connected in series to the second fuse, the second common-mode inductor is connected in parallel to the fourth capacitor, a collector of the triode is connected to the second common-mode inductor, a base and the collector of the triode are connected to the total voltage output terminal, and the fifth capacitor is connected in series between the base of the triode and the total voltage output terminal, to form the filter circuit.

Optionally, the relay control circuit in each output control module is in a symmetrical configuration. An active filter circuit is formed to avoid noise crosstalk between various paths.

Optionally, the device further includes an insulation housing, within which the power input module, the sequence generator, and the output control module are all disposed. In this way, leakage is avoided, and safety of the power supply device is improved.

It may be learned from the foregoing technical solutions that the power supply device for a triple quadrupole mass spectrometer provided in the present application includes the power input module, the sequence generator, and the output control module. The power input module is connected to the power supply to receive the input voltage from the power supply. The power input module includes the energy storage circuit and the current-limiting circuit. Current limiting and filtering are performed on the input voltage through the energy storage circuit and the current-limiting circuit, to protect a circuit of the power input module and suppress an interference signal in the input voltage. A positive output terminal of the power input module is connected to the sequence generator. The sequence generator includes the transformer circuit and the relay signal circuit, so that the sequence generator converts a positive output voltage from the power supply into the auxiliary voltage and a relay control signal. The auxiliary voltage is used to drive the subsequent relay signal circuit and supply power to the output control module. The relay control signal is used to control on and off of the output control module. The sequence generator is connected to the power input module to transmit the auxiliary voltage and the relay control signal to the output control module. On and off of a circuit of the output control module is controlled through the relay control signal, thereby sequentially powering on the output control module. The power input module is connected to the output control module to transmit the input voltage from the power supply to the output control module. The output control module includes the relay control circuit. In the relay control circuit, noise crosstalk between various paths is avoided through the active filter circuit, and the output power supply voltage is protected through the fuse and the diode. The output control module transmits the processed power supply voltage to the electrical device of the triple quadrupole mass spectrometer under the control of the sequence generator, thereby improving quality of power supply. The device is further provided with the insulation housing. In this way, electric shock may be avoided during use of the device, thereby ensuring safety of the device.

BRIEF DESCRIPTION OF THE DRAWINGS

To more clearly describe the technical solutions of the present application, the accompanying drawings to be used in the embodiments are briefly described below. Obviously, persons of ordinary skills in the art may also derive other accompanying drawings according to these accompanying drawings without an effective effort.

In the figures:
1: voltage input terminal; 2: voltage output terminal; 3: single voltage input terminal; 4: auxiliary voltage output terminal; 5: relay signal output terminal; 6: primary voltage input terminal; 7: auxiliary voltage input terminal; 8: relay signal input terminal; 9: total voltage output terminal.

DETAILED DESCRIPTION OF THE EMBODIMENTS

Embodiments are described below in detail, and examples thereof are shown in the accompanying drawings. When the descriptions below relate to the accompanying drawings, unless otherwise stated, same numbers throughout various accompanying drawings indicate same or similar elements. Implementations described in the following embodiments do not represent all implementations in accordance with the present application, just examples of a system and a method that are described in detail in the claims and in accordance with some aspects of the present application are provided.

In clinical practice, during use, the triple quadrupole mass spectrometer requires a dedicated power supply device to supply power thereto. However, because the power supply device of the triple quadrupole mass spectrometer faces requirements for a plurality of groups of multipath power supply, a design of the power supply device is crucial. Moreover, each group of power supply circuits faces a problem of noise crosstalk, which seriously affects quality of a power supply.

To avoid inter-circuit crosstalk of the power supply device, a plurality of groups of independent devices are typically used to supply power to the triple quadrupole mass spectrometer. However, use of a plurality of groups of independent power supplies greatly increases power supply costs. Moreover, when being powered on by a plurality of groups of power supply simultaneously, demand for a current at a moment of power on is too large to meet subsequent electrical requirements. In addition, in an electrical device that needs to be powered on simultaneously by a positive power supply and by a negative power supply, a significant difference in supply time between the positive power supply and the negative power supply may cause a damage to the electrical device.

Figure 1:
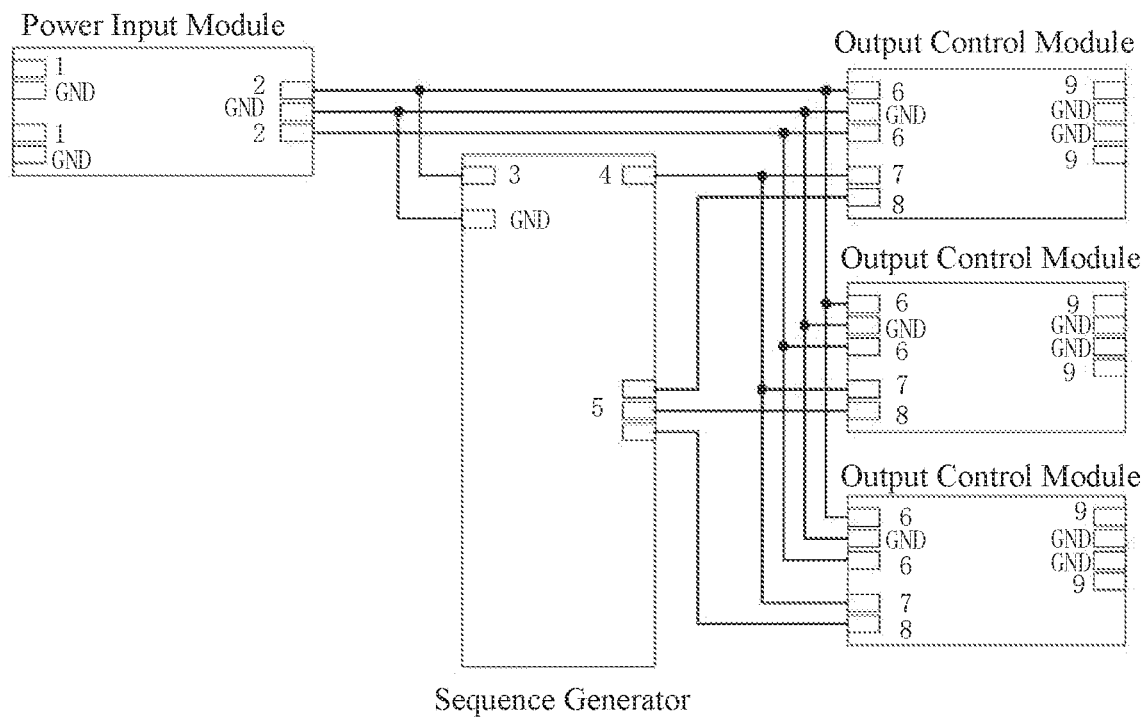
FIG. 1 is a schematic diagram illustrating a connection structure of a power supply device for a triple quadrupole mass spectrometer.

To resolve the foregoing problem, referring to FIG. 1, a power supply device for a triple quadrupole mass spectrometer is provided in the present application, including a power input module, a sequence generator, and an output control module.

The power input module includes a voltage input terminal 1, a voltage output terminal, 2 and an energy storage circuit. The voltage input terminal 1 is connected to a power supply, and is configured for receiving of an input voltage from the power supply. The energy storage circuit is connected to the power supply through the voltage input terminal 1. The energy storage circuit is connected to the sequence generator and the output control module through the voltage output terminal 2, to output the input voltage from the power supply through the voltage output terminal 2. As shown in FIG. 1, there are two voltage output terminals 2 in FIG. 1, an upper one of which is a positive polarity and a lower one of which is a negative polarity.

For example, if the voltage input terminal 1 is connected to a power supply of 24V, an upper voltage input terminal 1 and a lower voltage input terminal 1 in FIG. 1 are respectively connected to voltages of ±24V. After being processed by the energy storage circuit, the voltages of ±24V are further output from the upper voltage output terminal 2 and the lower voltage output terminal 2 in FIG. 1.

Because a triple quadrupole instrument has high requirements for both power ripple and transient response, if a switch mode power supply is used, a filtering capability is contradictory to a transient response; and if a linear power supply is used, the linear power supply is not suitable for being applicable to a clinical triple quadrupole instrument due to an excessively large volume. Therefore, in some embodiments, the energy storage circuit includes a first common-mode inductor and a first capacitor. The first common-mode inductor is connected in parallel to the first capacitor. The first common-mode inductor and the first capacitor are disposed between the voltage input terminal 1 and the voltage output terminal. In an electronic circuit, an inductance coil has a current limiting function on an alternating current, in view of the following inductive reactance formula of inductance:

$$XL = 2\pi fL$$

In the formula, XL represents inductive reactance, f represents a frequency, and L represents inductance.

It may be learned from the inductive reactance formula that larger inductance L and a higher frequency f indicates larger inductance XL. Therefore, the inductance coil has a function of enabling a low frequency to pass through but blocking a high frequency, which is a filtering principle of the inductor. A most common function of the inductor in a circuit is to form an LC filter circuit together with a capacitor C. The capacitor has a characteristic of "blocking a direct current but enabling an alternating current to pass through". The inductor has a characteristic of "enabling a direct current to pass through but blocking an alternating current, and enabling a low frequency to pass through but blocking a high frequency".

Figure 2:
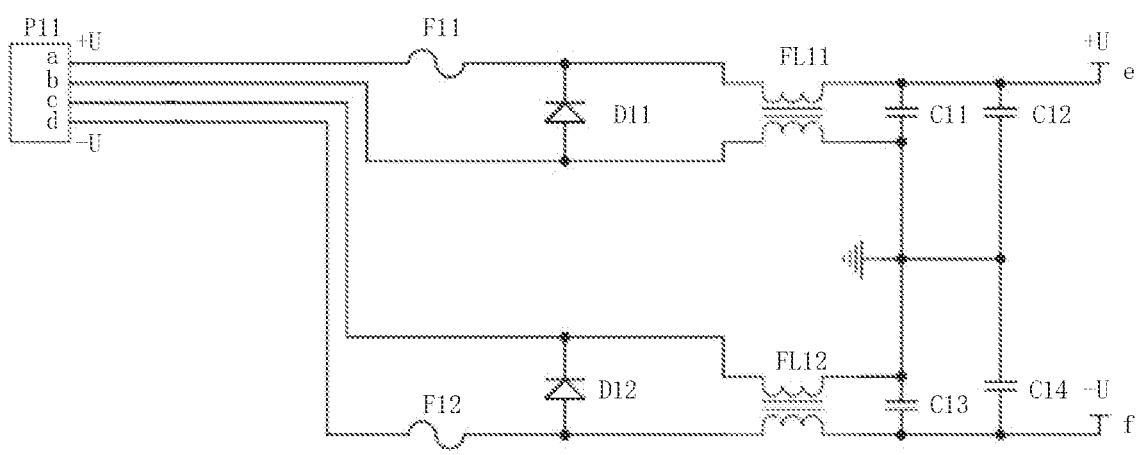
FIG. 2 is a diagram illustrating an inner circuit of a power input module according to an embodiment of the present application.

For example, as shown in FIG. 2, a direct current (+U) accompanied by an interference signal passes through a filter circuit composed of an FL11 and a C11. A majority of an alternating current interference signal is blocked and absorbed by the common-mode inductor FL11 to become magnetic induction and thermal energy, and a majority of the remaining of the alternating current interference signal is bypassed and guided to the ground by a first capacitor C11. In this way, the interference signal is suppressed, and a relatively pure direct current may be output through the voltage output terminal 2. A direct current (−U) accompanied by an interference signal passes through a filter circuit composed of an FL12 and a C13. A majority of an alternating current interference signal is blocked and absorbed by a common-mode inductor FL12 to become magnetic induction and thermal energy, and a majority of the remaining is bypassed and guided to the ground by a first capacitor C13. In this way, the interference signal is suppressed, and a relatively pure direct current may be output through the voltage output terminal 2. C12 and C14 may be filter capacitors.

In some embodiments, the power input module further includes a current-limiting circuit. The current-limiting circuit includes first fuses F11 and F12 and first diodes D11 and D12. The first diode D11 may be connected in parallel to the first fuse F11. The first fuse F11 is connected in series to the voltage input terminal 1. The first diode D11 is connected in parallel to the first common-mode inductor FL11. For example, as shown in FIG. 2, the current-limiting circuit is formed by the first fuse F1 and the first diode D11. The first fuse F11 and the first diode D11 have anti-reversed connection functions. When polarity of a direct current power supply is connected correctly, a direct current voltage (+U) is applied across a load through the fuse. Due to small direct current resistance of the first fuse F11, losses of the direct current voltage are also small and may be ignored. The first diode D11 is turned on when the positive polarity and the negative polarity of the direct current power supply are connected reversely. In this case, a voltage across the load is clamped near a forward voltage drop of the first diode D11, a current flowing through the first fuse F11 is very large, and the first fuse F11 is fused, so as to protect the load. If the first fuse F11 is a resettable fuse, resistance of the first fuse F11 becomes large, so that a current flowing through the load is very small, and then the load may also be protected. The current may be limited after passing through the fuse F11, thereby protecting the circuit.

As shown in FIG. 2, P11 in FIG. 2 represents the voltage input terminal 1; a represents the positive polarity of the voltage input terminal 1; d represents the negative polarity of the voltage input terminal 1; b and c respectively represent grounding terminals; and e and f respectively represent a positive output terminal and a negative output terminal of the voltage output terminal 2. A loop circuit of the positive polarity is the same as that of the negative polarity. For example, taking a loop of the positive polarity as an example, if the P11 is connected to a power supply of 24V, a voltage of +24V is input through the terminal a. The voltage of +24V is processed through the current-limiting circuit and the energy storage circuit, and a voltage of +24V with less interference signals is output through the terminal e of the voltage output terminals 2. Similarly, a loop of the negative polarity finally outputs a voltage of −24V with less interference signals through the terminal f of the voltage output terminals 2.

The positive polarity of the voltage output terminal 2 is connected to the sequence generator. Referring to FIG. 1, the sequence generator includes a single voltage input terminal 3, an auxiliary voltage output terminal 4, a relay signal output terminal 5, a transformer circuit, and a relay control circuit. The single voltage input terminal 3 is connected to the positive polarity of the voltage output terminal 2. The transformer circuit is connected to the single voltage input terminal 3. The transformer circuit is configured to convert a positive voltage from the voltage output terminal into an auxiliary voltage. The auxiliary voltage is lower than the positive voltage from the voltage output terminal 2. For example, the power input module is connected to a power supply of 24V. After the power supply is processed through the power input module, a voltage of +24V is input to the positive polarity of the voltage output terminal 2.

The positive polarity of the voltage output terminal 2 is connected to the single voltage input terminal 3 of the sequence generator. The voltage of +24V is led into the sequence generator through the single voltage input terminal 3, wherein the voltage of +24V is converted into an auxiliary positive voltage below +24V after passing through the transformer circuit, to drive a subsequent circuit.

Figure 3:
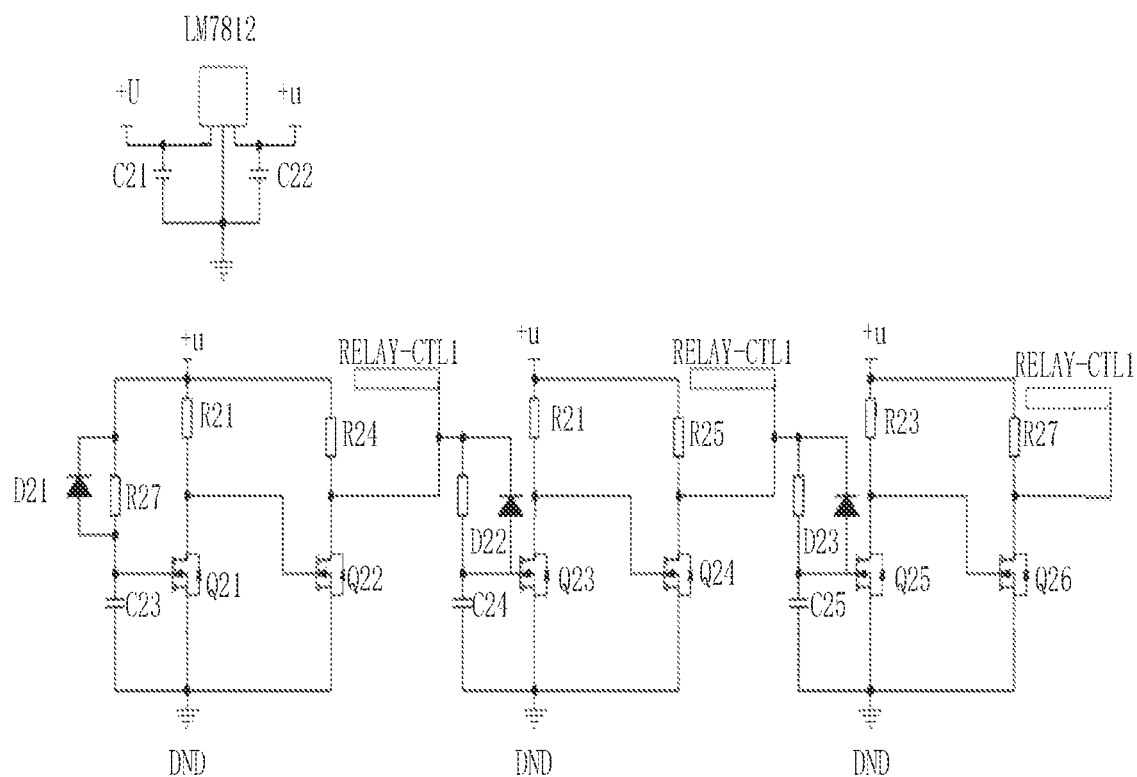
FIG. 3 is a diagram illustrating an inner circuit of a sequence generator according to an embodiment of the present application.

In some embodiments, referring to FIG. 3, the transformer circuit includes an integrated circuit chip and second capacitors C21 and C22. The integrated circuit chip is connected in parallel to the second capacitors C21 and C22. A pin of the integrated circuit chip is connected to the single voltage input terminal 3. For example, the integrated circuit chip may be LM7812. LM7812 refers to a three-terminal voltage regulator IC chip component, suitable for various power supply voltage regulator circuits, having advantages such as good output stability, easy to use, overcurrent output, and overheating automatic protection. +U is a positive voltage output from the power input module, and +u is a voltage converted through the transformer circuit. For example, the power input module is connected to a power supply of 24V, and then +U is +24V; and both C21 and C22 are 1 μF, and then in a circuit shown in FIG. 3, a value of +u is half of +U, that is, a voltage value of the auxiliary voltage +u is +12V. The transformer circuit is connected to the auxiliary voltage output terminal 4, so as to output the auxiliary voltage through the auxiliary voltage output terminal 4. The relay signal circuit is connected to the auxiliary voltage output terminal 4. The relay signal circuit is configured to convert the auxiliary voltage into a relay signal.

In some embodiments, referring to FIG. 3, the relay signal circuit includes second diodes D21, D22, and D23; third capacitors C23, C24, and C25; a charging resistor, such as R27; and at least two first metal-oxide semiconductor field-effect transistors Q21, Q22, Q23, Q24, Q25, and Q26. The at least two first metal-oxide semiconductor field-effect transistors are connected in parallel to each other. The second diode D21 is connected in parallel to the charging resistor R27. The third capacitor C23 is connected in series to the charging resistor R27. The first metal-oxide semiconductor field-effect transistor Q21 may be connected in parallel to the charging resistor R27. The metal-oxide semiconductor field-effect transistor (MOS) is a field-effect transistor of an insulated gate type. Therefore, the MOS transistor is sometimes referred to as an insulated gate field-effect transistor, and is typically used in an amplification circuit or a switching circuit. As shown in FIG. 3, RELAY-CTLn indicates a relay signal output from the relay signal circuit. Each relay signal circuit may output a set of relay signals, and a number of the relay signal circuits is equal to that of output control modules. For example, taking the relay signal circuit corresponding to RELAY-CTL1 as an example, the R27 is 10 MΩ, both R21 and R24 are 1 KΩ, the C23 is 1 μF, both the Q21 and the Q22 use AO3400A, and the auxiliary voltage is +12V; in FIG. 3, the second diode D21 is connected in parallel to the charging resistor R27; after the auxiliary voltage of +12V is connected, an initial voltage across the C23 are 0, and the second diode D21 is cut off; about 1 second later, the voltage across the C23 reaches an on threshold of the Q21, while a gate electrode of the Q22 is at a low level; and after the Q22 is cut off, the RELAY-CTL1 is at a high level. Similarly, the RELAY-CTL1 charges the C24 through the R24; through a same circuit, RELAY-CTL2 is turned on immediately after RELAY-CTL1 is turned on, and the RELAY-CTL1 and the RELAY-CTL2 are sequentially cascaded to RELAY-CTLn. After power is supplied to another electrical device by the power supply device, the C23, the C24, and the C25 are discharged through the D21, the D22, and the D23, and go back to initial states. The relay control circuit is connected to the relay signal output terminal 5 to output the relay signal RELAY-CTLn to the output control module through the relay signal output terminal 5. R25 and R23 may indicate charging resistors.

The output control module includes a primary voltage input terminal 6, an auxiliary voltage input terminal 7, a relay signal input terminal 8, a total voltage output terminal 9, and a relay control circuit. Referring to FIG. 1, the primary voltage input terminal 6 is connected to the voltage output terminal 2, the auxiliary voltage input terminal 7 is connected to the auxiliary voltage output terminal 4, and the relay signal input terminal 8 is connected to the relay signal output terminal 5. The relay control circuit is connected to the relay signal input terminal 8, to control on and off of the relay control circuit according to the relay signal. The relay control circuit is connected to the auxiliary voltage input terminal 7, to enable the auxiliary voltage to supply power to the relay control circuit. The relay control circuit is connected to the primary voltage input terminal 6 and the total voltage output terminal 9, to output the input voltage from the power supply.

Figure 4:
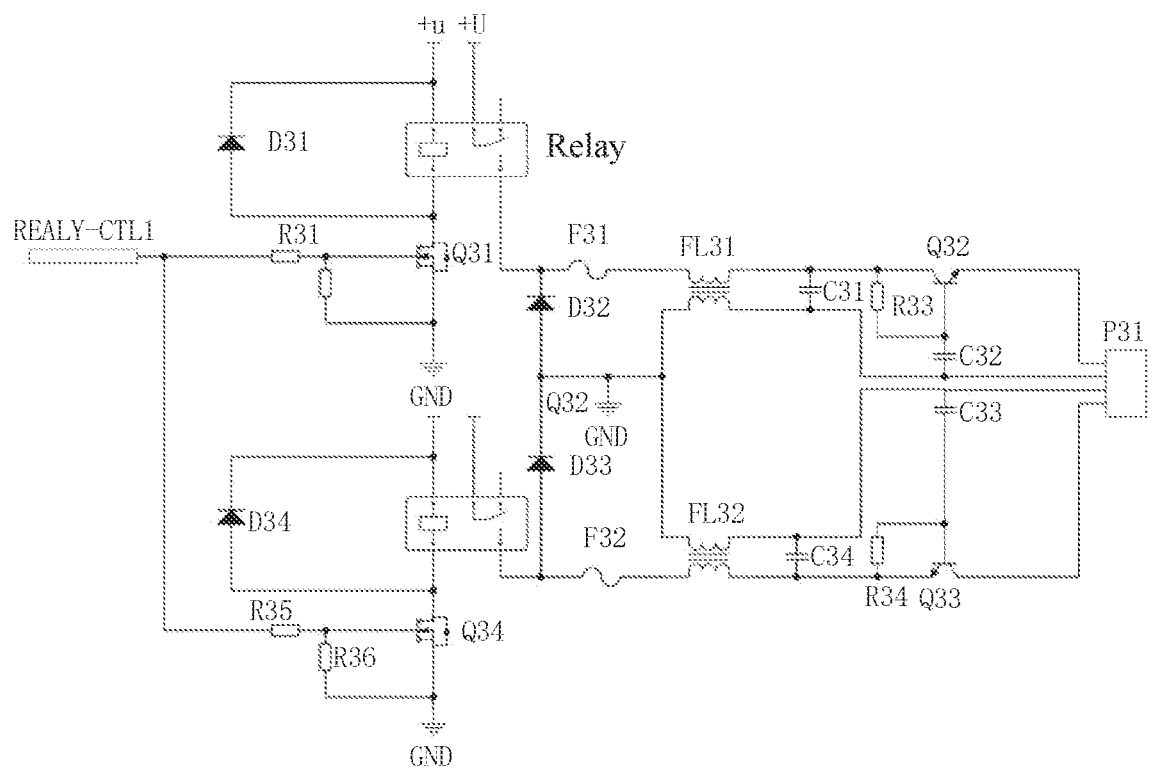
FIG. 4 is a diagram illustrating an inner circuit of an output control module according to an embodiment of the present application.

In some embodiments, referring to FIG. 4, the relay control circuit includes a relay, third diodes D31 and D34, and second metal-oxide semiconductor field-effect transistors Q31 and Q34. The relay is connected in series to the second metal-oxide semiconductor field-effect transistors Q31 and Q34. The third diodes D31 and D34 are connected in parallel to the relay. The relay is connected in series to the primary voltage input terminal 6 and the auxiliary voltage input terminal 7. The second metal-oxide semiconductor field-effect transistor is connected in series to the relay signal input terminal 8. The relay is connected in series to the total voltage output terminal 9. There are a plurality of output control modules. The relay control circuit in each of the output control modules is in a symmetrical configuration. The relay is an electrical control device that causes a predetermined step change in a controlled quantity in an electrical output circuit to occur when a change in an input quantity meets specified requirements. The relay has a control system and a controlled system, and is typically applicable to an automated control circuit, to play roles in automatic regulation, safety protection, circuit conversion, and the like in the circuit. As shown in FIG. 4, the second metal-oxide semiconductor field-effect transistors Q31 and Q34 control the relay, and complete switch control on the output of the input voltage from the power supply through the relay. In FIG. 4, P31 indicates the total voltage output terminal 9. When the RELAY-CTL1 is at a high level, a corresponding relay is turned on, and the input voltage (+U) from the power supply is output from the terminal P31. The terminal P31 is connected to the triple quadrupole mass spectrometer, to enable the power supply device to supply power to the triple quadrupole mass spectrometer. Q32 and Q33 may be general field-effect transistors.

In some embodiments, referring to FIG. 4, the relay control circuit further includes second fuses F31 and F32 and fourth diodes D32 and D33. The second fuses F31 and F32 are connected in parallel to the fourth diodes D32 and D33. The second fuses F31 and F32 are connected in series between the relay and the total voltage output terminal 9. As shown in FIG. 4, the second fuses F31 and F32 and the fourth diodes D32 and D33 form a protection circuit, to protect an output current.

In some embodiments, the relay control circuit further includes a filter circuit. The filter circuit includes second common-mode inductors FL31 and FL32, a fourth capacitor C34, a fifth capacitor C32, filter resistors R31, R33, R34, R35, and R36, and a triode. The filter resistor is connected in parallel to the fourth capacitor C34. The second common-mode inductors FL31 and FL32 are connected in series to the second fuses F31 and F32. The second common-mode inductor FL32 is connected in parallel to the fourth capacitor C34. A collector of the triode is connected to the second common-mode inductor FL32. A base and the collector of the triode are connected to the total voltage output terminal 9. The fifth capacitor C32 is connected in series between the base of the triode and the total voltage output terminal 9. As shown in FIG. 4, the second common-mode inductor FL32 and the fourth capacitor C34 form a passive filter circuit, and the R33, the R34, C33, the C32, the Q32, and the Q33 form an active filter circuit, thereby avoiding noise crosstalk between various paths. C31 may be a filter capacitor.

To ensure safety of the power supply device, in some embodiments, the device further includes an insulation housing. The power input module, the sequence generator, and the output control module are all disposed within the insulation housing. By using insulation characteristics of the insulation housing, electric shock may be avoided during use of the power supply device. The insulation housing may be made of a plastic material such as ABS, HIPS, PP, PE, PVC, or PU.

It can be learned from the foregoing technical solutions that the power supply device for a triple quadrupole mass spectrometer provided in the present application includes the power input module, the sequence generator, and the output control module. The power input module is connected to the power supply. The positive output terminal of the power input module is connected to the sequence generator, so that the sequence generator converts a positive output voltage from the power supply into the auxiliary voltage and the relay control signal. The sequence generator is connected to the power input module to transmit the auxiliary voltage and the relay control signal to the output control module, thereby controlling on and off of the output control module, and sequentially powering on the output control module. The power input module is connected to the output control module to transmit the input voltage from the power supply to the output control module. The output control module transmits the processed power supply voltage to the electrical device of the triple quadrupole mass spectrometer under control of the sequence generator, thereby improving quality of power supply.

The power supply device for a triple quadrupole mass spectrometer provided in the present application may satisfy requirements on a plurality of groups of multipath power supply, thereby avoiding noise crosstalk between various groups of power supply circuits, and ensuring the quality of power supply. By sequentially powering on, a difference in powering on time caused by simultaneous supplying power by a plurality of paths of power of a single power supply may be avoided, having advantages of high power supply quality and high safety.

For similar parts between the embodiments provided in the present application, reference may be made to each other. The specific implementations described above are merely some examples under a general concept of the present application, and do not constitute any limitation to the protection scope of the present application. For a person skilled in the art, any other implementations derived according to the solutions of the present application without an effective effort all fall within the protection scope of the present application.

What is claimed is:

1. A power supply device for a triple quadrupole mass spectrometer, comprising a power input module, a sequence generator, and an output control module, wherein the power input module, having a voltage input terminal and a voltage output terminal, comprises an energy storage circuit, wherein the voltage input terminal is connected to a power supply, and is configured for receiving of an input voltage from the power supply; the energy storage circuit is connected to the power supply through the voltage input terminal; and the energy storage circuit is connected to the sequence generator and the output control module through the voltage output terminal, so as to output the input voltage from the power supply through the voltage output terminal;

the sequence generator, having a single voltage input terminal, an auxiliary voltage output terminal and a relay signal output terminal, comprises a transformer circuit and a relay signal circuit, wherein the single voltage input terminal is connected to a positive polarity of the voltage output terminal; the transformer circuit is connected to the single voltage input terminal and is configured to convert a positive voltage from the voltage output terminal into an auxiliary voltage lower than the positive voltage from the voltage output terminal, and the transformer circuit is connected to the auxiliary voltage output terminal to output the auxiliary voltage through the auxiliary voltage output terminal; and the relay signal circuit is connected to the auxiliary voltage output terminal and is configured to convert the auxiliary voltage into a relay signal, and the relay signal circuit is connected to the relay signal output terminal to output the relay signal through the relay signal output terminal; and the output control module, having a primary voltage input terminal, an auxiliary voltage input terminal, a relay signal input terminal and a total voltage output terminal, comprises a relay control circuit, wherein the primary voltage input terminal is connected to the voltage output terminal; the auxiliary voltage input terminal is connected to the auxiliary voltage output terminal; the relay signal input terminal is connected to the relay signal output terminal; and the relay control circuit is connected to the relay signal input terminal to control on and off of the relay control circuit according to the relay signal, is connected to the auxiliary voltage input terminal to enable the auxiliary voltage to supply power to the relay control circuit, and is connected to the primary voltage input terminal and the total voltage output terminal to output the input voltage from the power supply, wherein the relay control circuit comprises a relay, a third diode, and a second metal-oxide semiconductor field-effect transistor, wherein the relay is connected in series to the second metal-oxide semiconductor field-effect transistor, the third diode is connected in parallel to the relay, the relay is connected in series to the primary voltage input terminal and the auxiliary voltage input terminal, the second metal-oxide semiconductor field-effect transistor is connected in series to the relay signal input terminal, and the relay is connected in series to the total voltage output terminal, wherein the relay control circuit further comprises a second fuse and a fourth diode, wherein the second fuse is connected in parallel to the fourth diode, and the second fuse is connected in series between the relay and the total voltage output terminal, and wherein the relay control circuit further comprises a filter circuit comprising a second common-mode inductor, a fourth capacitor, a fifth capacitor, a filter resistor, and a triode, wherein the filter resistor is connected in parallel to the fourth capacitor, the second common-mode inductor is connected in series to the second fuse, the second common-mode inductor is connected in parallel to the fourth capacitor, a collector of the triode is connected to the second common-mode inductor, a base and the collector of the triode are connected to the total voltage output terminal, and the fifth capacitor is connected in series between the base of the triode and the total voltage output terminal.

2. The power supply device for a triple quadrupole mass spectrometer according to claim 1, wherein the energy storage circuit comprises a first common-mode inductor and a first capacitor, wherein the first common-mode inductor is connected in parallel to the first capacitor, and the first common-mode inductor and the first capacitor are disposed between the voltage input terminal and the voltage output terminal.

3. The power supply device for a triple quadrupole mass spectrometer according to claim 2, wherein the power input module further comprises a current-limiting circuit, wherein the current-limiting circuit comprises a first fuse and a first diode, and wherein the first diode is connected in parallel to the first fuse, the first fuse is connected in series to the voltage input terminal, and the first diode is connected in parallel to the first common-mode inductor.

4. The power supply device for a triple quadrupole mass spectrometer according to claim 1, wherein the transformer circuit comprises an integrated circuit chip and a second capacitor, wherein the integrated circuit chip is connected in parallel to the second capacitor, and a pin of the integrated circuit chip is connected to the single voltage input terminal.

5. The power supply device for a triple quadrupole mass spectrometer according to claim 1, wherein the relay signal circuit comprises a second diode, a third capacitor, a charging resistor, and at least two first metal-oxide semiconductor field-effect transistors, wherein the at least two first metal-oxide semiconductor field-effect transistors are connected in parallel to each other, the second diode is connected in parallel to the charging resistor, the third capacitor is connected in series to the charging resistor, and the first metal-oxide semiconductor field-effect transistor is connected in parallel to the charging resistor.

6. The power supply device for a triple quadrupole mass spectrometer according to claim 1, wherein the relay control circuit in each output control module is in a symmetrical configuration.

7. The power supply device for a triple quadrupole mass spectrometer according to claim 1, wherein the device further comprises an insulation housing, within which the power input module, the sequence generator, and the output control module are all disposed.

* * * * *